United States Patent
Raese

(10) Patent No.: US 7,102,979 B2
(45) Date of Patent: Sep. 5, 2006

(54) SYSTEMS AND METHODS FOR CONTROLLING THE VOLTAGE ON THE LENS OF ELECTRON EMITTER DEVICES

(75) Inventor: J. Craig Raese, Boise, ID (US)

(73) Assignee: Hewlett-Packard Development Company, LP., Houston, TX (US)

( * ) Notice: Subject to any disclaimer, the term of this patent is extended or adjusted under 35 U.S.C. 154(b) by 815 days.

(21) Appl. No.: 10/046,443

(22) Filed: Nov. 7, 2001

(65) Prior Publication Data

US 2003/0086352 A1    May 8, 2003

(51) Int. Cl.
*G11B 7/00* (2006.01)
*G11B 9/10* (2006.01)

(52) U.S. Cl. ...................... 369/101; 369/126
(58) Field of Classification Search ................ 369/101, 369/126
See application file for complete search history.

(56) References Cited

U.S. PATENT DOCUMENTS

| | | | | |
|---|---|---|---|---|
| 3,894,271 A | * | 7/1975 | Pfeiffer et al. | 315/384 |
| 4,423,305 A | * | 12/1983 | Pfeiffer | 219/121.28 |
| 5,557,596 A | * | 9/1996 | Gibson et al. | 369/101 |
| 6,515,287 B1 | * | 2/2003 | Notte, IV | 250/396 ML |
| 6,643,248 B1 | * | 11/2003 | Naberhuis et al. | 369/126 |
| 6,797,965 B1 | * | 9/2004 | Abe | 250/491.1 |
| 6,872,964 B1 | * | 3/2005 | Naberhuis et al. | 257/10 |
| 2004/0213128 A1 | * | 10/2004 | Marshall | 369/101 |

* cited by examiner

*Primary Examiner*—Thang V. Tran
*Assistant Examiner*—Adam R. Giesy

(57) ABSTRACT

Methods for controlling the voltage on a lens of an electron emitting device are provided. A representative method includes: supplying an emitter voltage to an electron emitter in the electron emitting device, wherein a current amplitude is established; sensing the emitter voltage on the electron emitter; supplying a non-inverted input voltage to an amplifier that follows the emitter voltage; and providing an amplifier output voltage from the amplifier to the lens, wherein the amplifier output voltage corresponds to the emitter voltage at the electron emitter. Systems, devices and other methods also are provided.

4 Claims, 7 Drawing Sheets

SYSTEMS AND METHODS FOR CONTROLLING THE VOLTAGE ON THE LENS OF ELECTRON EMITTER DEVICES

BACKGROUND OF THE INVENTION

1. Field of the Invention

The present invention generally relates to data storage and, more specifically, to systems and methods for controlling the voltage on the lens of electron emitters in atomic resolution storage (ARS) devices.

2. Description of the Related Art

The apparent insatiability of consumers for higher capacity, higher speed memory storage devices has led to the development of memory storage techniques such as atomic resolution storage (ARS). As is Known, a storage device employing ARS technology includes a number of electron emitters, such as field emitters, for example, that are adapted to write data to and read data from various storage areas of a storage medium.

During operation, an electron beam current is extracted from an emitter towards a corresponding storage area. Writing of data from an emitter to a storage area is accomplished by temporarily increasing the power density of the electron beam current to modify the structural state of the surface of the storage area. In contrast, reading data from the storage area is accomplished by observing the effect of the storage area on the electron beam of the emitter, or the effect of the electron beam on the storage area. More specifically, reading typically is accomplished by collecting secondary and/or backscattered electrons when an electron beam, i.e., an electron beam with a lower power density than that of the electron beam utilized for writing data to the storage area, is applied to the storage medium.

An ARS storage medium is formed of material characterized by a structural state that can be changed from crystalline to amorphous by a beam of electrons. Since the amorphous state has a different secondary electron emission coefficient (SEEC) and backscattered electron coefficient (BEC) than the crystalline state, a different number of secondary and backscattered electrons are emitted from each storage area in response to an electron beam, depending upon the current structural state of that storage area. Thus, by measuring the number of secondary and backscattered electrons, the structural state of the storage area and, therefore, the data stored by the storage area, may be determined.

A problem with emitters is in controlling the focal point of the emitted beam. If the beam is not properly focused, writing operations may fail, which may result in data being lost. Similarly, an improperly focused beam may hamper or even prohibit reading operations as well. Thus, there is a need for a system and method to control the focal point of the emitted beam for a plurality of electron emitters in an ARS.

Another problem is that it is difficult to physically locate emitter circuitry proximate to the emitters that are being controlled due to space limitations of the individual electrical components. Typically, the silicon area under the emitter is limited and usually reserved for emitter control circuitry, which has the highest priority for this area. Thus, there is a need for a system and method to remove certain electrical components and related circuitry from underneath the emitters while still controlling the focal point of the emitted beam of all electron emitters in an ARS.

SUMMARY OF THE INVENTION

Briefly described, the present invention relates to atomic resolution storage (ARS) techniques. In this regard, embodiments of the present invention may be construed as providing memory storage devices and methods that employ, at least in part, ARS technology.

An embodiment of one such method for controlling the voltage on a lens of an electron emitting device includes: supplying an emitter voltage to an electron emitter in the electron emitting device, wherein a current amplitude is established; sensing the emitter voltage on the electron emitter; supplying a non-inverted input voltage to an amplifier that follows the emitter voltage; and providing an amplifier output voltage from the amplifier to the lens, wherein the amplifier output voltage corresponds to the emitter voltage at the electron emitter.

Another method includes: supplying an emitter voltage to an electron emitter in the electron emitting device; sensing the emitter voltage on the electron emitter; summing the sensed emitter voltage and a desired lens voltage; and providing a voltage output that is the sum of the emitter voltage and the desired lens voltage to the lens of the electron emitting device.

Other embodiments of the invention can be construed as storage devices. An embodiment of one such storage device includes an electron emitter and a lens to adjust the focal point of a beam emitted from the electron emitter. The storage device also includes a sensing switch coupled to the electron emitter to sense voltage on the electron emitter. Additionally, an amplifier is coupled to the sensing switch that follows the voltage on the electron emitter. In particular, the sensing switch is coupled to an input of the amplifier and the output of the amplifier is coupled to the lens. The output of the amplifier drives the voltage on the lens.

An embodiment of an electron emitting storage device incorporates: emitter means for emitting electrons toward a storage medium; lens means for focusing emitted electrons from the emitter means into an optimized focal point on the storage medium; means for sensing voltage applied to the emitter means; amplifier means for providing an output voltage to the lens means that is relative to the voltage applied to the emitter means; and means for adjusting input voltage to the amplifier means so that the output voltage to the lens means changes.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
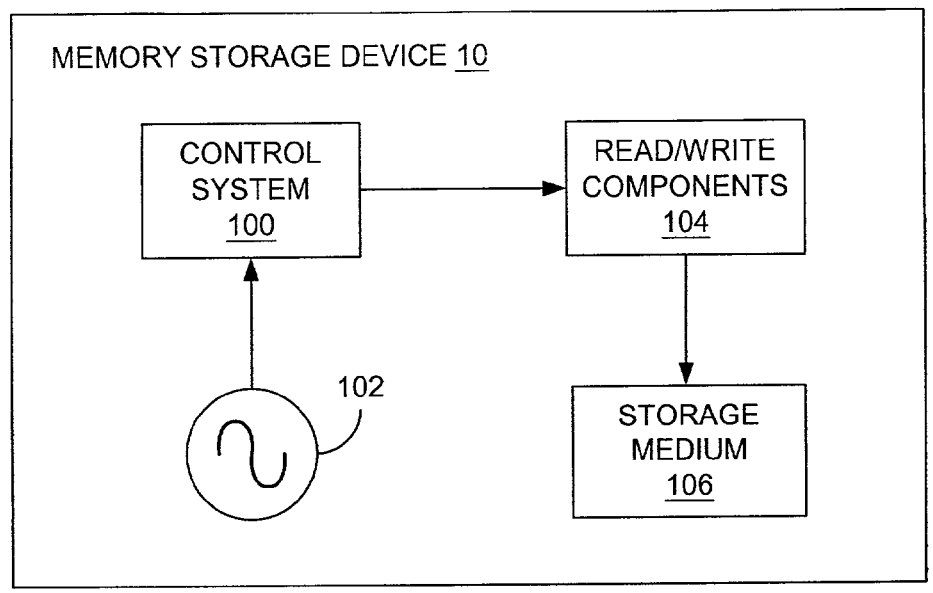
FIG. 1 is a schematic diagram of an embodiment of the memory storage device of the present invention.

Reference will now be made to the drawings wherein like numerals indicate corresponding parts throughout the several views. As shown in FIG. 1, an embodiment of the memory storage device 10 of the present invention includes a control system 100. Control system 100 electrically communicates with a current source 102. Control system 100 provides current from current source 102 to read/write components 104 so as to enable reading of data from and/or writing of data to storage medium 106. As described in detail hereinafter, memory storage device 10 utilizes ARS technology for the storage and retrieval of data.

Figure 2:
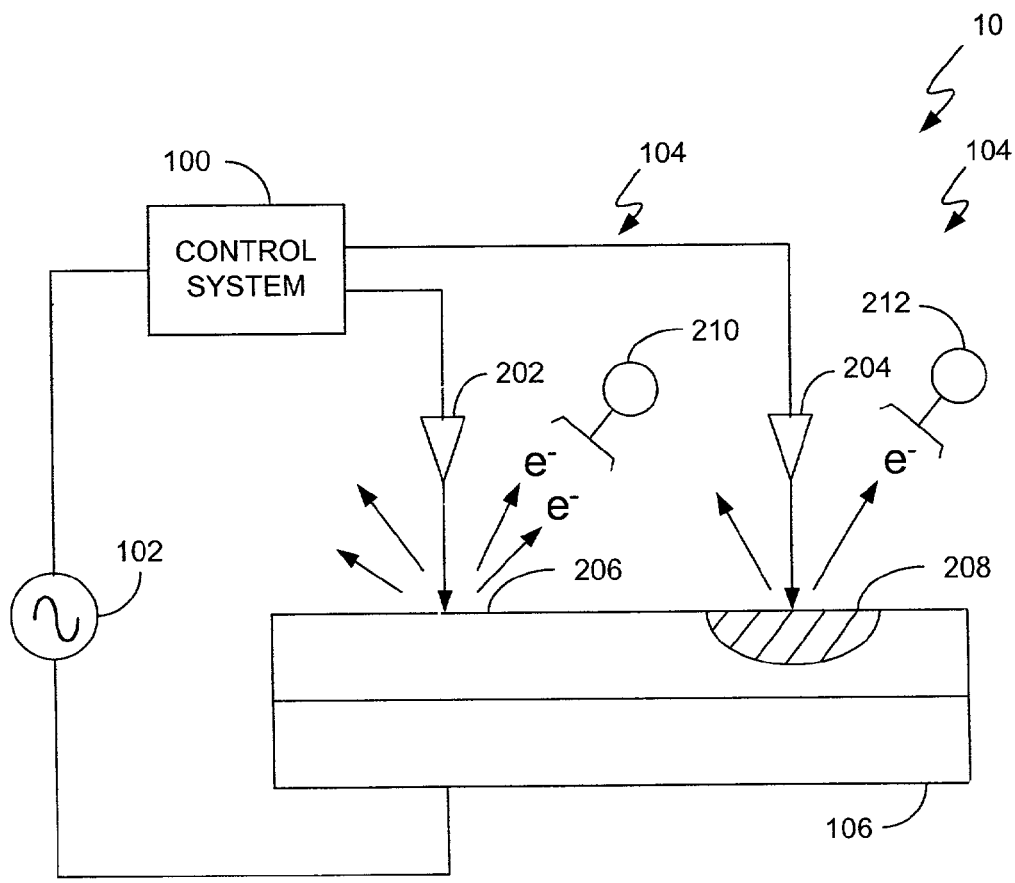
FIG. 2 is a schematic diagram illustrating emitters reading from the storage medium of FIG. 1

FIG. 2 schematically depicts a preferred embodiment of memory storage device 10 that employs ARS technology. In FIG. 2, representative emitters 202 and 204, e.g., field emitters, are shown reading from storage medium 106. In particular, emitter 202 is reading from storage area 206 and emitter 204 is reading from storage area 208. Storage areas 206 and 208 are provided with different structural states, as described hereinbefore. So provided, when electrons provided from a source, e.g., current source 102, are extracted from the emitters and into the respective storage areas, a different number of secondary electrons and/or backscattered electrons may be detected relative to each storage area. Detection of the secondary and/or backscattered electrons may be accomplished by electron collectors, e.g., collectors 210 and 212. As utilized herein, the term "read/write components" may be used to refer to an emitter(s) and/or an emitter(s) and its associated collector(s). Additionally, the term "emitter" is utilized herein as referring to any emitter configuration, such as a field emitter, ballistic emitter, quasi-ballistic emitter, flat emitter, etc.

In operation, the magnitude of a signal current collected by the electron collectors is monitored. Based upon the determined magnitude, the structural state of and, therefore, the data stored in the storage area may be identified. Typically, the data stored in a given storage area corresponds to a bit. It should be noted that the difference in the number of secondary electrons and/or backscattered electrons collected from one storage area, as compared to a storage area having a different structural state, may be greater or lesser depending upon the type of material and/or the type of modification made to the material.

Figure 3:
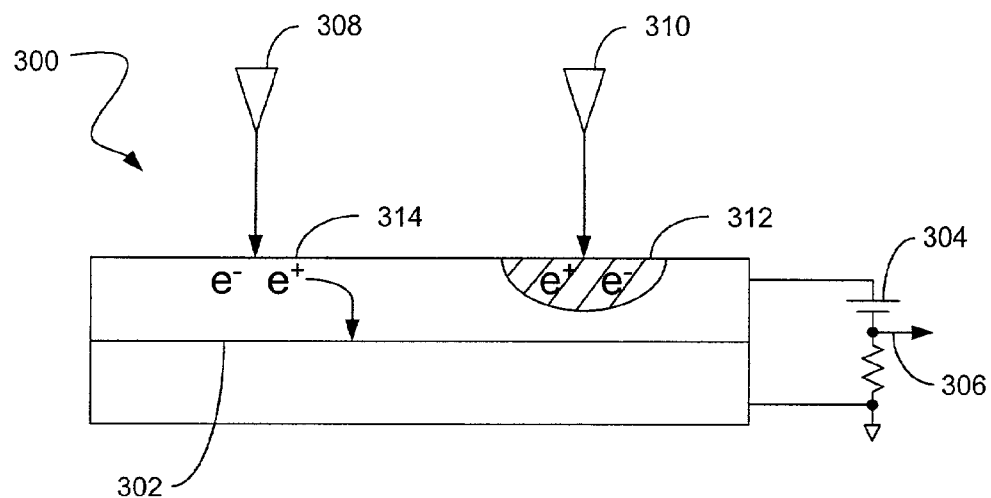
FIG. 3 is a schematic diagram illustrating emitters reading from the storage medium of FIG. 1.
Figure 4:
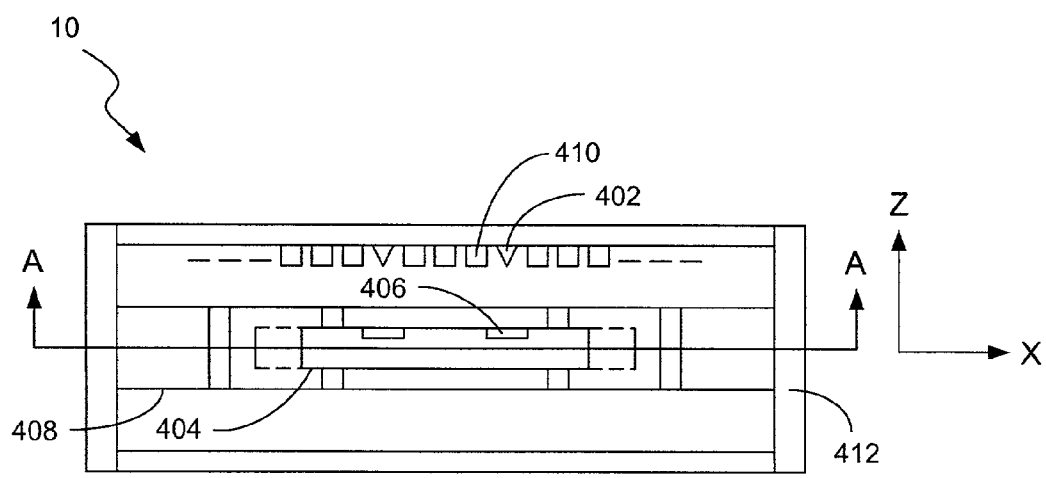
FIG. 4 is a schematic diagram illustrating an embodiment of the memory storage device of FIG. 1.
Figure 5:
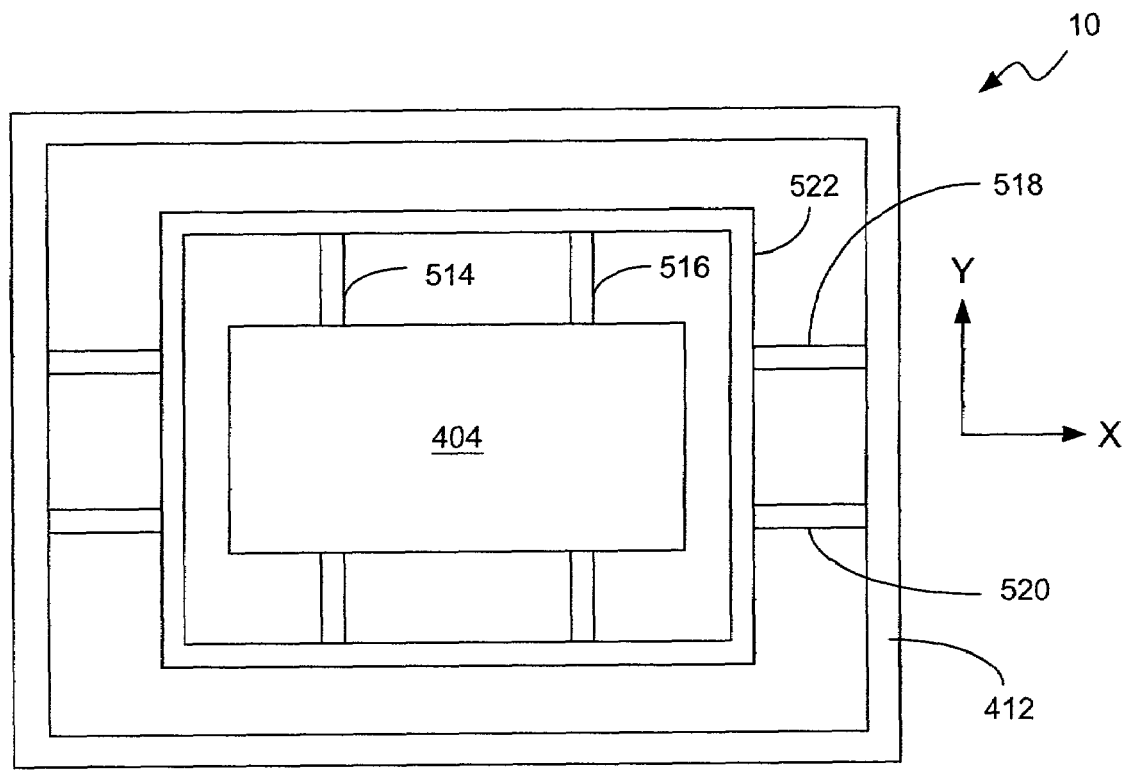
FIG. 5 is a schematic diagram illustrating the memory storage device of FIG. 4, as viewed along section line A—A.

Referring now to FIGS. 3 through 5, other embodiments of ARS systems that may implement the present invention will be described in greater detail. These figures are disclosed and described in U.S. Pat. No. 5,557,596, which is hereby incorporated by reference in its entirety. It should be noted, however, that the ARS systems shown and described herein are not the only ARS systems to be utilized with the present invention. To the contrary, the present invention may be utilized with various types and configurations of ARS systems provided that such a system is capable of writing data to and/or reading data from a storage medium.

FIG. 3 schematically depicts a technique for writing data to and/or reading data from an ARS storage area. As shown in FIG. 3, storage medium 300 is based on a diode structure, which may be a PN junction, a Schottky, barrier, or any other type of electronic valve. Data is stored by locally altering the surface of the diode in such a way that collection efficiency for minority carriers generated by the altered region is different from that of an unaltered region. The collection efficiency for minority carriers is defined as the fraction of minority carriers generated by the instant electrons which are swept across the diode junction 302 when it is biased by an external circuit 304 to cause a signal current 306 to flow in the external circuit. Although FIG. 3 illustrates a preferred external circuit 304, it will be appreciated that this circuit is provided for purposes of example only.

In operation, the emitters 308 and 310 emit narrow beams of electrons onto the surface of the storage medium 300. The incident electrons excite electron-hole pairs near the surface of the diode. Because the diode is reverse-biased by the external circuit 304, minority carriers that are generated by the incident electrons are swept toward the diode junction 302.

Electrons that reach the junction 302 are then swept across the junction. Accordingly, minority carriers that do not recombine with majority carriers before reaching the junction are swept across the junction, causing a current flow in the external circuit 304.

Writing to the storage medium 300 is accomplished by increasing the power density of the electron beam enough to locally alter the physical properties of the diode. This alteration affects the number of minority carriers swept across the junction 302 when the same area is radiated with a lower power density (read) electron beam. For instance, the recombination rate in a written area 312 could be increased relative to an unwritten area 314 so that the minority carriers generated in the written area 312 have an increased probability of recombining with minority carriers before they have a chance to reach and cross the junction 302. Hence, a smaller current flows in the external circuit 304 when the read electron beam is incident upon a written area 312 than when it is incident upon an unwritten area 314. Conversely, it is also possible to start with a diode structure having a high recombination rate and to write bits by locally reducing the recombination rate. In such an embodiment, the magnitude of the current resulting from the minority carriers depends upon the state of the storage area and the current continues the output signal to indicate the bit stored.

FIGS. 4 and 5 illustrate an embodiment of memory storage device 10. In this regard, FIG. 4 shows a side, cross-sectional view of memory storage device 10, which includes a number of field emitters 402, a storage medium 404 that incorporates a number of storage areas 406, and a micromover 408 that scans the storage medium with respect to the field emitters or vice versa. In a preferred embodiment, each storage area 406 is responsible for storing one bit of information. As mentioned hereinbefore, the field emitters are responsible for reading data from and/or writing data to the storage areas by utilizing electron beams. Thus, field emitters suitable for the present invention preferably are of the type that produce electron beams which are narrow enough to achieve the desired bit density of the storage medium, and which provide the power density of the beam current needed for reading from and writing to the storage medium. As mentioned hereinbefore, however, in other applications, various other emitter types may be utilized.

During operation, a predetermined potential difference is applied between a field emitter 402 and a corresponding gate, such as a circular gate 410, which surrounds the emitter. So provided, an electron beam current is extracted from the emitter 402 towards the storage area 406. Depending upon the distance between the emitters 402 and the storage medium 404, the type of emitters, and the spot size (e.g., bit size), electron optics may be useful in focusing the electron beams. Voltage also may be applied to the storage medium 404 to either accelerate or decelerate the emitted electrons or to aid in focusing the emitted electrons. A casing 412 also may be provided which maintains the storage medium 404 in a partial vacuum.

FIG. 5 shows a top view of the cross-section A—A of FIG. 4 and illustrates the storage medium 404 being held by two sets of thin-walled microfabricated beams 514 and 516, and 518 and 520. Although a beam-type micromover is shown and described herein, various other types and configurations of micromovers may be utilized by the present invention. Faces of the first set of thin-walled beams, i.e., 514 and 516, are in the X-Z plane. This set of beams may be flexed in the X direction allowing the storage medium 404 to move in the X direction with respect to the casing 412. Faces of the second set of thin-walled beams, i.e., 518 and 520, are in the Y-Z plane. This set of beams allows the storage medium 404 to move in the Y direction with respect to the casing 412. The storage medium is held by the first set of beams to a frame 522. The frame is held by the second set of beams to the casing 512. Thus, the field emitters may scan over the storage medium 404, or the storage medium may scan over the field emitters, in the X–Y directions by electrostatic, electromagnetic, piezoelectric or other suitable methods and/or mechanisms.

Figure 6A:
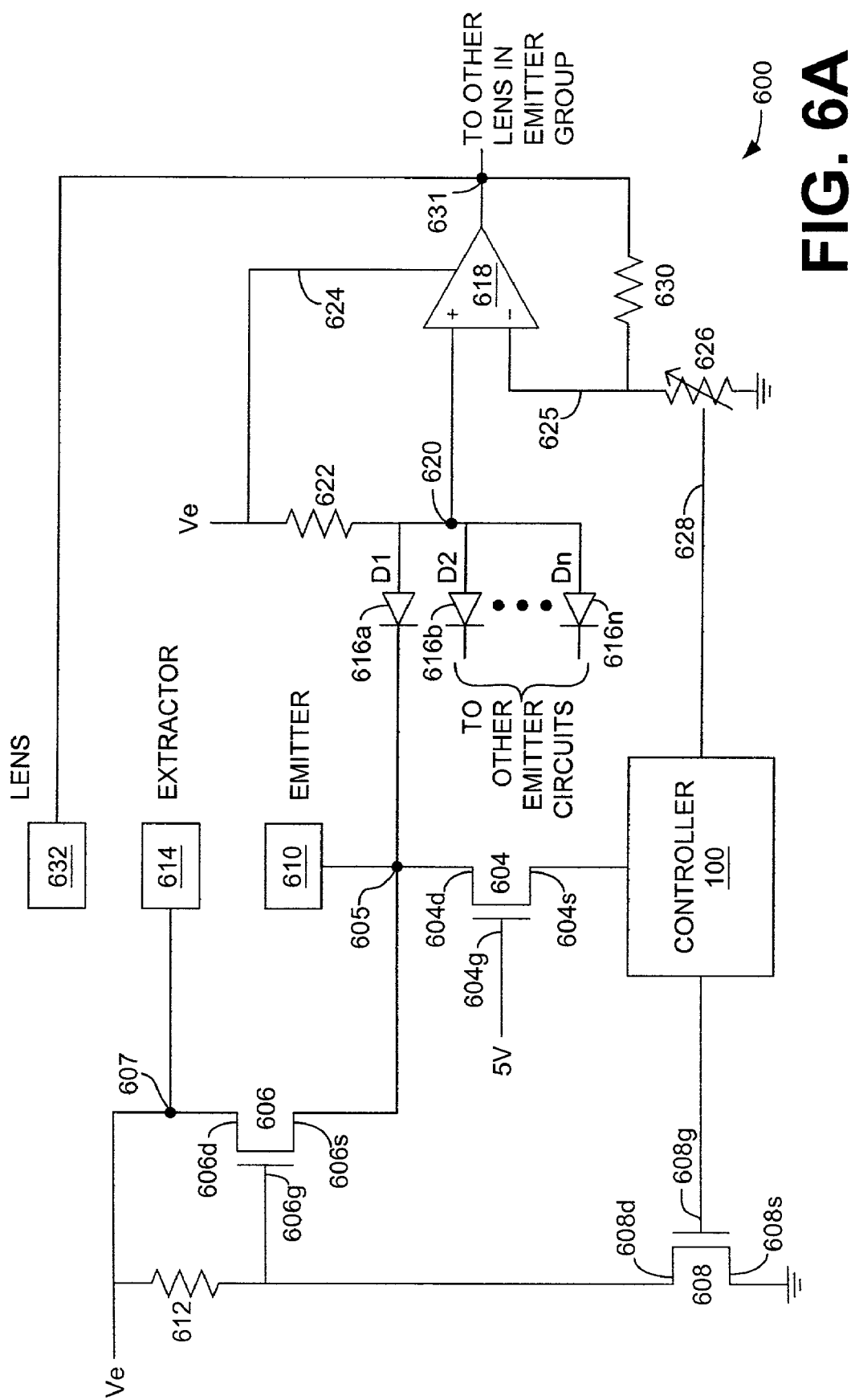
FIG. 6A is a schematic diagram depicting an embodiment of the control system and read/write components of FIG. 1.

Referring now to FIG. 6A, circuit 600 depicts the architecture of an embodiment of the control system 100 and read/write components 104. As shown in FIG. 6A, circuit 600 includes control system 100 and transistors 604, 606 and 608. By example, and not for purpose of limitation, the transistors may be field effect transistors. Control system 100 electrically communicates with the various transistors so that a predetermined current flows to an emitter, such as emitter 610.

In the embodiment depicted in FIG. 6A, transistor 604 is coupled between control system 100 (hereinafter "controller") and emitter 610. More specifically, the drain 604d of transistor 604 is coupled to node 605, which is also coupled to emitter 610, and the source 604s of transistor 604 is coupled to controller 100. The gate terminal 604g of transistor 604 is connected to, preferably, a 5V source.

Transistor 606 operates to rapidly charge the stray capacitance on node 605 and is coupled between node 605 and node 607, which is coupled to emitter voltage source Ve. The source 606s of transistor 606 is coupled to node 605, and the drain 606d of transistor 606 is coupled to node 607, which also is coupled to extractor 614 and emitter voltage source Ve. Emitter voltage source Ve is also connected to resistor 612. Resistor 612 is coupled between the emitter voltage source Ve and both the gate terminal 606g of transistor 606 and the drain 608d of transistor 608. Transistor 608 operates when turned on by controller 100 to turn transistor 606 on and off accordingly. As such, the gate terminal 608g of transistor 608 is coupled to the controller 100, and the source 608s of transistor 608 is coupled to ground.

Sensing diode 616a is coupled between the node 605 and operational amplifier 618. More specifically, diode 616a is positioned with its cathode coupled to node 605 and its anode coupled to node 620, which is connected to an input of amplifier 618. As such diode 616a is forward biased when the emitter 610 is active and is reverse biased when the emitter 610 is not active, which essentially results as an open circuit. Diodes 616b through 616n are similarly coupled between node 620 and the other emitters circuits. In this group, one emitter 610 is active at a time, and the sensing diodes 616a . . . 616n sense the voltage on the active emitter. Thus, the sensing diode connected to the active emitter is forward biased, and the other diodes are all reverse biased. Finally, a resistor 622 is coupled between node 620 and the emitter voltage source Ve.

Amplifier 618 is configured in a non-inverting implementation and is coupled to emitter voltage source Ve via connection 624. The negative terminal 625 of amplifier 618 is coupled to a variable resistor 626. Controller 100 controls resistor 626 via connection 628, which in turn controls the gain on amplifier 618. More specifically, variable resistor 626 may be programmed by the controller 100 to adjust the gain of the amplifier 618. The value of the gain of the amplifier 618 may be determined by a calibration procedure. By way of example, if the resistance of variable resistor 626 is set low, then the resulting output of amplifier 618 to lens 632 is high. If the resistance value of variable resistor is set high (significantly higher than resistor 630), then the output voltage of amplifier 618 will essentially be the voltage input at node 620.

Lens 632 may be controlled to focus the electron beam that is emitted from emitter 610 and drawn through extractor 614. By adjusting the voltage supplied to the lens 610, the focal point of the emitted beam is changed, which can be manipulated for reading and writing operations in the memory storage device 10.

A feedback resistor 630 is coupled between the output of amplifier 618 at node 631 and the negative input terminal of amplifier 618. The output of amplifier 618 at node 631 is also coupled to the lens 632 of the electron emitting device 10 (FIG. 1). The output at node 631 from amplifier 618 may also be coupled to other lenses in the emitter group for the electron emitting device 10.

Figure 6B:
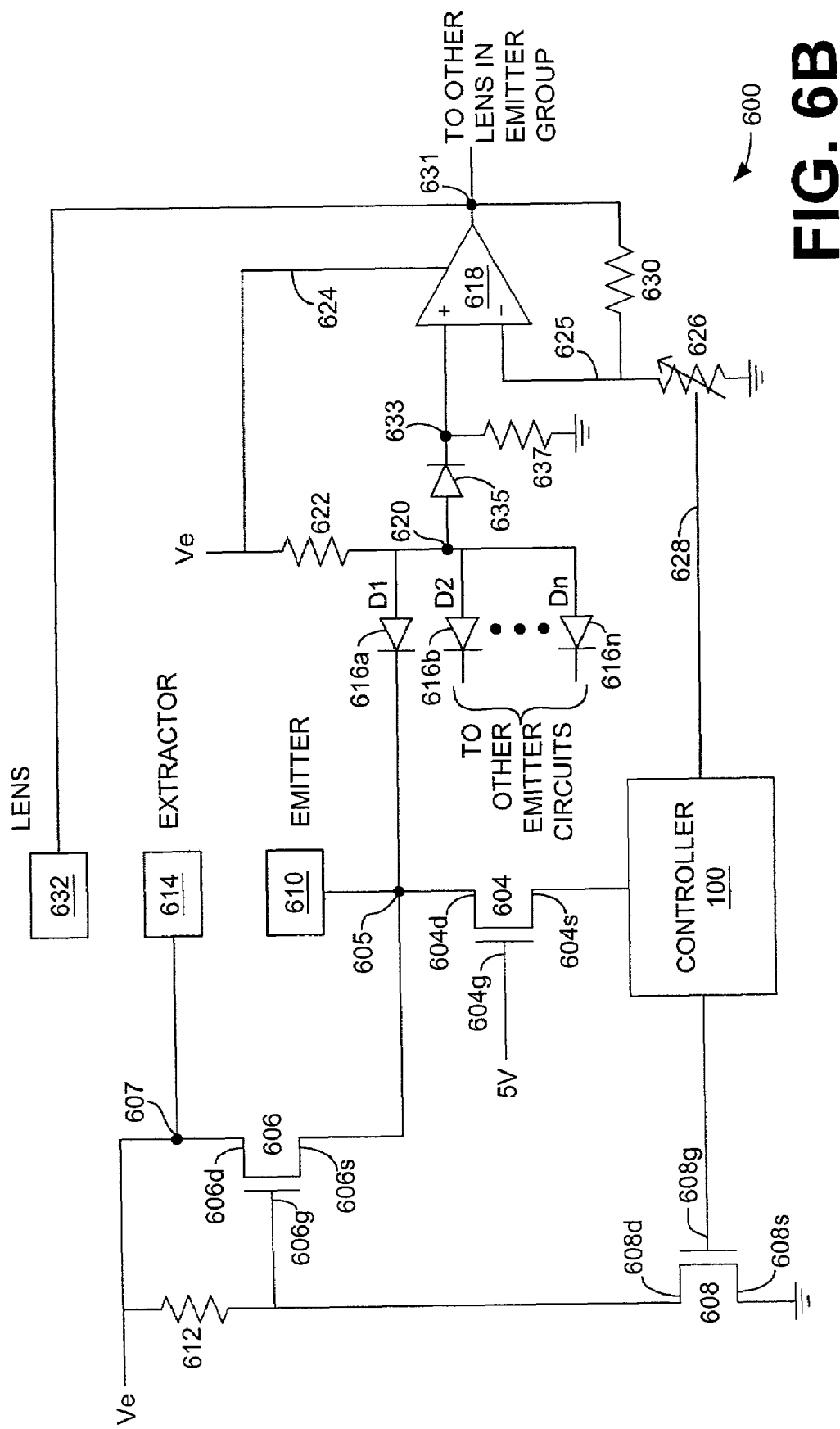
FIG. 6B is a schematic diagram depicting an alternative embodiment of the control system and read/write components of FIG. 1.

FIG. 6B is a diagram depicting an alternative embodiment to the configuration shown in FIG. 6A. If the voltage on the non-inverting terminal input 620 is impacted by a voltage drop across the sensing diode 616a, which may have a temperature sensitivity, a compensating diode 635 may be placed between node 620 and node 633, which is the positive terminal input of operational amplifier 618. Moreover, a bias resistor 637 may be connected between the anode of the compensating diode 635 and amplifier 618 at node 633. The bias resistor 637 would also be connected to ground.

One of ordinary skill in the art would also recognize that resistors 622 and 637 could each be replaced by a transistor current source (not shown) controlled by controller 100. Each current source would turn on after an emitter is activated. Similarly, each current source would turn off when no emitters are active.

As an alternative embodiment (not shown), amplifier 618 may be replaced by non-inverting summer circuit (not shown) that sums the emitter voltage and the desired lens voltage. Thus, it should be obvious to one that is familiar with the art that other electrical components may be substituted in the place of amplifier 618, which perform the similar functions described above.

In another alternative embodiment (not shown), sensing diode 616 may be replaced by an electronic switch comprised of one or more high-breakdown voltage MOS transistors (not shown). In this case, the transistor would be configured to sense voltage at node 605 and turn on when the voltage reaches a threshold value. When the high-breakdown MOS transistor(s) is turned on, the voltage at node 620 enables amplifier 618 to follow the voltage on the emitter 610. The gate of this transistor may be controlled by controller 100. Thus, it should be obvious to one that is familiar with the art that other electrical components may be inserted in the place of sensing diode 616 that perform a similar function to the sensing diode 616.

Figure 7:
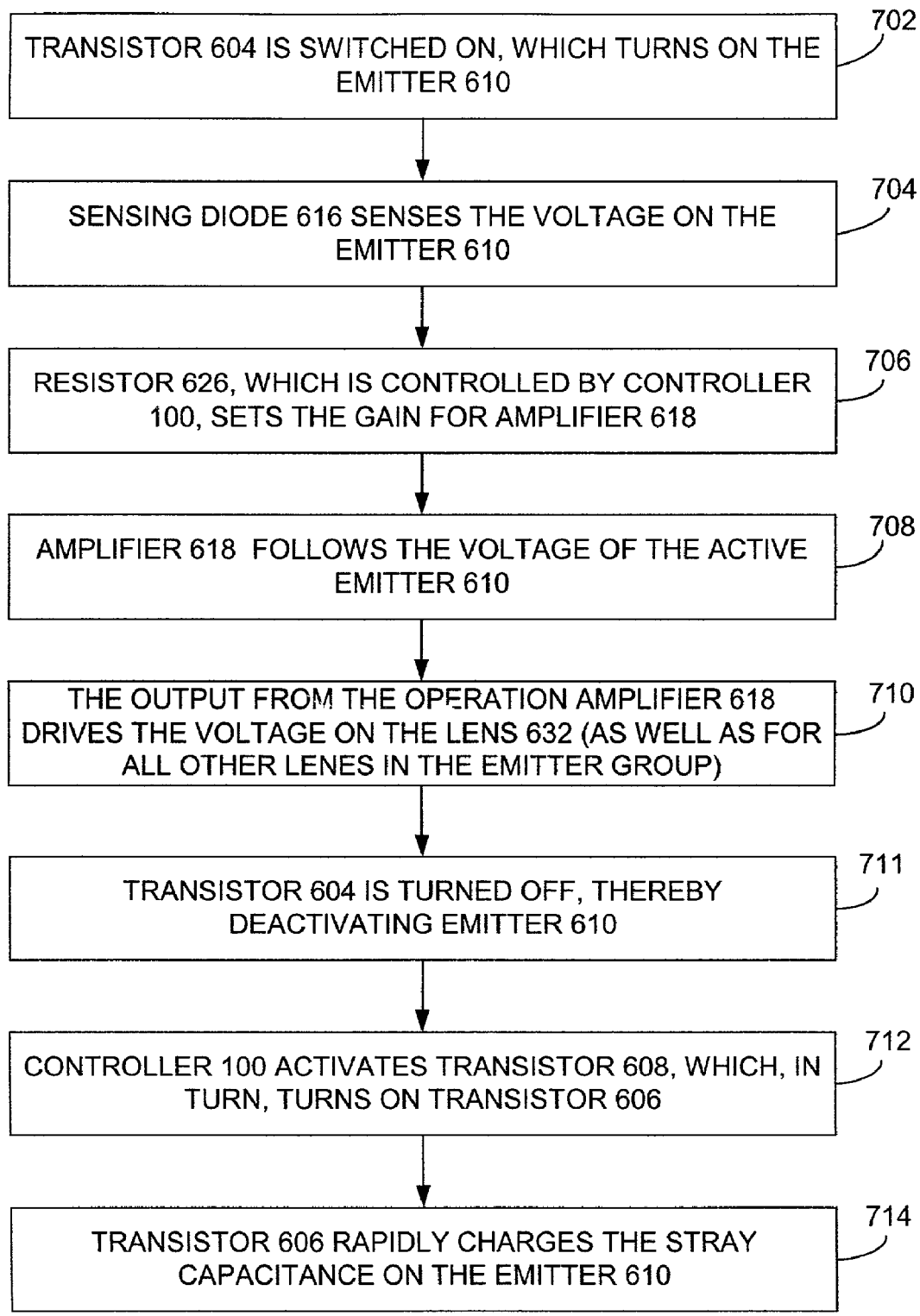
FIG. 7 is a flowchart diagram depicting a method for implementing the embodiment shown in FIG. 6A.

FIG. 7 is a block diagram of a method 700 for controlling the voltage on lens 632 with the circuit implementation depicted in FIG. 6A. In step 702, transistor 604 is turned on which, in turn, activates the emitter 610. The current supply to the emitter flows through transistor 604 and a current amplitude is set, as discussed above, by controller 100. In step 704, sensing diode 616a senses the voltage on the emitter 610. One emitter is activated at a time, and diodes 616a, 616b . . . 616n are used to sense the voltage on the emitter that is active. In step 706, resistor 626 is controlled by controller 100 to set or program the gain of amplifier 618. In step 708, the amplifier 618 follows the voltage of the active emitter 610 in relative fashion.

The output of amplifier 618, as shown in step 710, is used to drive the voltage on lens 632 and all other lenses in the designated emitter group. This allows the amplifier circuit 618 to be shared among all the emitters in the group and can also be placed outside the silicon area directly underneath the emitters. As stated above, the silicon area under the emitters may be limited. Thus, individual emitter control circuitry may have priority in this area, thereby necessitating the placing of the amplifier 618 and related circuitry outside the area underneath the emitters. By adjusting the gain, in step 706, of the amplifier 618 with resistor 626, the focal point of the beam from the active emitter 610 may be optimized by lens 632.

In step 711, transistor 604 is turned off, thereby deactivating emitter 610. In step 712, controller 100 activates or turns on transistor 608 via gate 608g. Transistor 608 is used to turn on or to turn off transistor 606. In step 714, transistor 606, when turned on, is used to rapidly charge the stray capacitance on the emitter node 605 or at the emitter 610. The result of this step allows for a fast turn-off of emission currents, as contributors to the total stray capacitance may include the sensing diode and transistor 604.

Embodiments of the controller 100 of the invention can be implemented in software (e.g., firmware), hardware, or a combination thereof. In an embodiment, where controller 100 is implemented in hardware, it can implemented with any or a combination of the following technologies, which are each well known in the art: a discrete logic circuit(s) having logic gates for implementing logic functions upon data signals, an embedded controller, an application specific integrated circuit (ASIC) having appropriate combinational logic gates, a programmable gate array(s) (PGA), a field programmable gate array (FPGA), etc.

In some embodiments, control of the device 10 is implemented in software, as an executable program, and is executed by a special or general purpose computer, such as a personal computer (PC; IBM-compatible, Apple-compatible, or otherwise), workstation, minicomputer, or mainframe computer. An example of a general purpose computer that can implement the system of the present invention is shown in FIG. 8.

Figure 8:
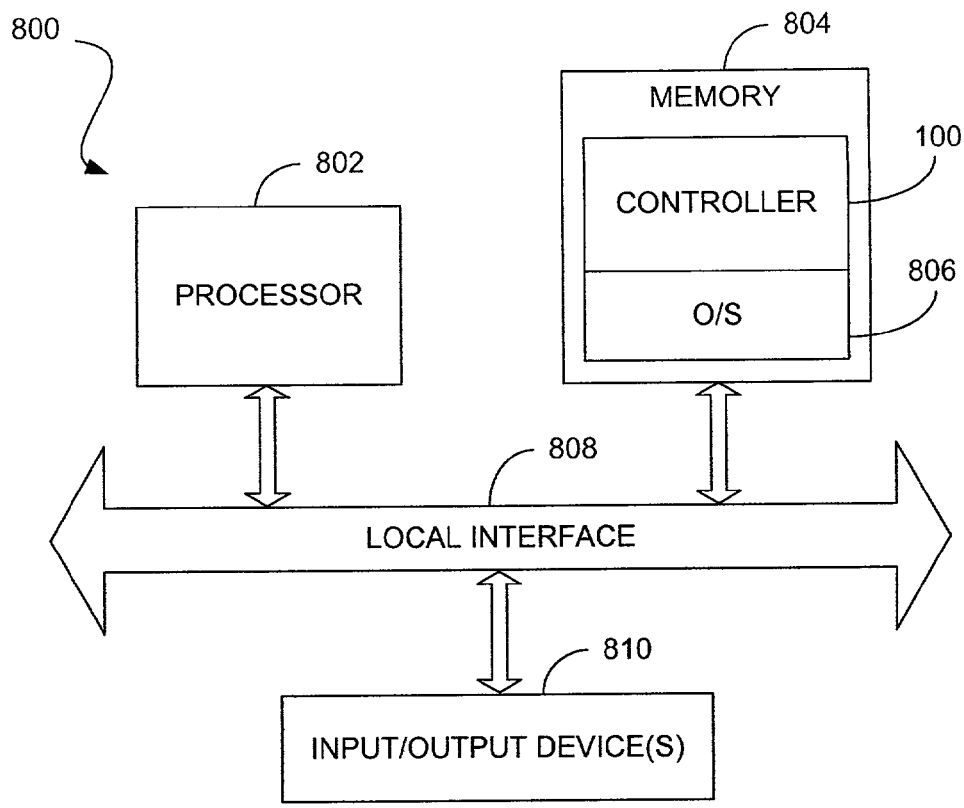
FIG. 8 is a schematic diagram of a computer or processor-based system, as shown in FIG. 1, which may be utilized by the controller of the present invention.

Generally, in terms of hardware architecture, as shown in FIG. 8, the computer 800 includes a processor 802, memory 804, and one or more input and/or output (I/O) devices 810 that are communicatively coupled via a local interface 808. The local interface 808 can be, for example but not limited to, one or more buses or other wired or wireless connections, as is known in the art. The local interface 808 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 802 is a hardware device for executing software that can be stored in memory 804. The processor 802 can be any custom made or commercially available processor, a central processing unit (CPU) or an auxiliary processor among several processors associated with the computer 800, and a semiconductor based microprocessor (in the form of a microchip) or a macroprocessor.

The memory 804 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 804 may incorporate electronic, magnetic, optical, and/or other types of storage media. Note that the memory 804 can have a distributed architecture, where various components are situated remote from one another, but can be accessed by the processor 802.

The software in memory 804 may include one or more separate programs, each of which comprises an ordered listing of executable instructions for implementing logical functions. In the example of FIG. 8, the software in the memory 804 includes the control system and a suitable operating system (O/S) 806. The operating system 806 essentially controls the execution of other computer programs, such as the controller 100, and provides scheduling, input-output control, file and data management, memory management, and communication control and related services.

When the controller 100 is implemented in software, as is shown in FIG. 8, it should be noted that the controller 100 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The controller 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

Figure 9:
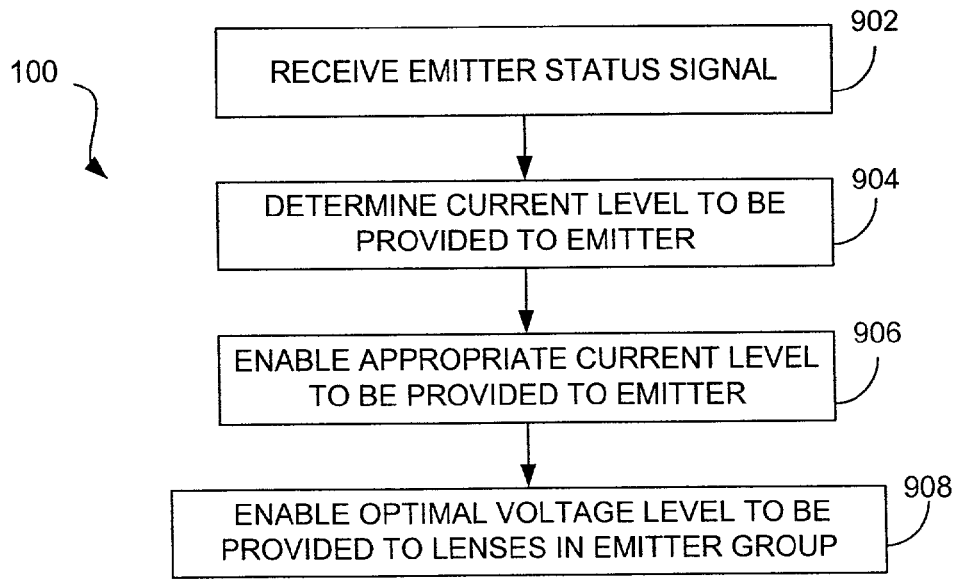
FIG. 9 is a flowchart depicting functionality of an embodiment of the controller of FIG. 8.

Functionality of the embodiment of the controller or method 100 of FIG. 9 may be construed as beginning at block 902 where an emitter status signal(s) is received. In block 904, a current level to be provided to the emitter is determined. Preferably, a determination of the appropriate current level to be provided to the emitter may be based upon an evaluation of the emitter status signal(s). Thereafter, such as depicted in block 906, providing the appropriate current level to the emitter is enabled. In block 908, based on the voltage supplied to the emitter, a relatively proportional voltage is established on the emitter's lens 632 (FIG. 6A) as well as all other lenses in the emitter group. Upon supplying the voltage to the lenses in the emitter group, the emitted electron beam is focused to a desired point for reading/writing operations.

The flow charts of FIGS. 7 and 9 show the functionality and operation of a possible implementation of controller 100. In this regard, each block represents a module, segment, or portion of code, which comprises one or more executable instructions for implementing the specified logical function(s). It should also be noted that in some alternative implementations, the functions noted in the blocks may occur out of the order noted in FIGS. 7 and 9. For example, two blocks shown in succession in either FIG. 7 or 9 may in fact be executed substantially concurrently or the blocks may sometimes be executed in the reverse order, depending upon the functionality involved, as will be further clarified hereinbelow.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

The invention claimed is:

1. A storage device comprising:
   an electron emitter;
   an atomic resolution storage medium having a storage area, a structural state of the storage area being alterable by a beam of electrons emitted by the electron emitter to represent information stored in the storage area;
   a lens to adjust the focal point of the beam of electrons emitted from the electron emitter onto the atomic resolution storage medium;
   a sensing switch coupled to the electron emitter to sense voltage on the electron emitter, the sensing switch being a sensing diode;
   an amplifier coupled to the sensing switch that follows the voltage on the electron emitter, wherein the sensing switch is coupled to an input of the amplifier and the output of the amplifier is coupled to the lens;
   a compensating diode coupled to the sensing diode and the amplifier, wherein the compensating diode compensates for a voltage drop across the sensing diode; and
   a bias resistor coupled to an amplifier side of the compensating diode and ground, wherein the output of the amplifier drives the voltage on the lens.

2. The storage device of claim 1, further comprising:
   a variable resistor coupled to an input of the amplifier, wherein the gain of the amplifier is adjusted according to the variable resistor.

3. A storage device comprising:
   an electron emitter;
   a lens to adjust the focal point of a beam emitted from the electron emitter,
   a sensing switch coupled to the electron emitter to sense voltage on the electron emitter; and
   an amplifier coupled to the sensing switch that follows the voltage on the electron emitter, wherein the sensing switch is coupled to an input of the amplifier and the output of the amplifier is coupled to the lens;
   wherein the output of the amplifier drives the voltage on the lens and the sensing switch is a sensing diode; and
   further comprising a plurality of additional sensing diodes coupled to the input of the amplifier and other electron emitters.

4. A storage device comprising:
   an electron emitter;
   a lens to adjust the focal point of a beam emitted from the electron emitter;
   a sensing switch coupled to the electron emitter to sense voltage on the electron emitter; and
   an amplifier coupled to the sensing switch that follows the voltage on the electron emitter, wherein the sensing switch is coupled to an input of the amplifier and to output of the amplifier is coupled to the lens;
   wherein the output of the amplifier drives the voltage on the lens and the sensing switch is a sensing diode; and
   further comprising:
      a compensating diode coupled to the sensing diode and the amplifier, wherein the compensating diode compensates for a voltage drop across the sensing diode; and
      a bias resistor coupled to the amplifier side of the compensating diode and ground.

* * * * *

UNITED STATES PATENT AND TRADEMARK OFFICE
CERTIFICATE OF CORRECTION

PATENT NO. : 7,102,979 B2 Page 1 of 1
APPLICATION NO. : 10/046443
DATED : September 5, 2006
INVENTOR(S) : J. Craig Raese It is certified that error appears in the above-identified patent and that said Letters Patent is hereby corrected as shown below:

On the face page, in field (73), in "Assignee", in column 1, line 2, delete "LP.," and insert -- L.P., --, therefor.

In column 10, line 25, in Claim 3, after "emitter" delete "," and insert -- ; --, therefor.

In column 10, line 46, in Claim 4, delete "and to" and insert -- and the --, therefor.

Signed and Sealed this

Sixteenth Day of March, 2010

David J. Kappos
*Director of the United States Patent and Trademark Office*